Figure 1:
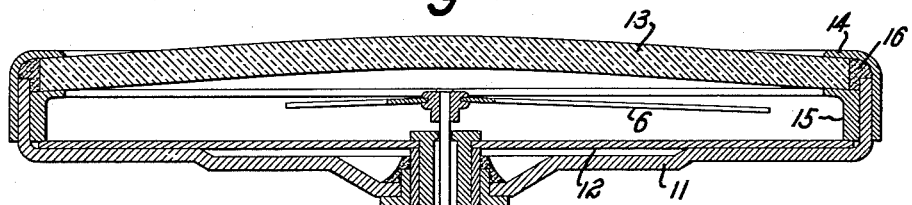

Dec. 19, 1944.  R. H. MURRAY  2,365,487
BIMETALLIC THERMOMETER
Filed Jan. 29, 1942

Damping Liquid

Inventor:
Royal H. Murray,
By Pierce & Scheffler,
Attorneys.

Patented Dec. 19, 1944

2,365,487

UNITED STATES PATENT OFFICE 2,365,487

BIMETALLIC THERMOMETER

Royal H. Murray, Newark, N. J., assignor to Weston Electrical Instrument Corporation, Newark, N. J., a corporation of New Jersey Application January 29, 1942, Serial No. 428,785

5 Claims. (Cl. 73—367)

This invention relates to bimetallic thermometers, and particularly to precision thermometers in which the bimetallic element is protected from damage from mechanical shock and moisture.

The bimetallic element of a sensitive thermometer is usually a thin ribbon wound in the form of a helical spring of one or more layers. The speed of response and the angular deflection of the instrument pointer vary with the thickness and the length of the bitmetallic ribbon, and the helical springs are necessarily long and delicate in a thermometer of high accuracy and low time lag. The weight of the instrument pointer and its staff is usually carried by the bimetallic ribbon, and this mechanical design for low friction losses materially increases the stresses to which the coiled bimetallic element is subjected by mechanical shocks arising from excessive vibration during normal use or from an accidental dropping of the instrument. The prior thermometers were quite delicate and readily susceptible to damage, and this was particularly true of the more sensitive instruments that necessarily required long helical windings of very thin bimetallic ribbons. Vibration and shock imparted to the instrument casing caused the spring to strike against the casing, thereby permanently distorting the delicate convolutions of the winding. In many instances the delicate spring was thrown out of axial alinement and thereafter rubbed against the casing wall. This rubbing contact rendered the instrument inaccurate whether or not additional errors arose from a permanent distortion of the windings.

Moisture within the thermometer casing has been another source of damage to thermometers that were subjected to temperature variations of a wide range. Moisture in the air trapped within the thermometer casing would condense and collect on the bimetallic spring and eventually rust the material, thus destroying the original calibration of the instrument.

The causes of damage to the prior precision thermometers of the bimetallic type were readily identified, but it was not possible to obtain mechanical stability by increasing the thickness of the bitmetallic element as the thicker bimetallic ribbon introduced an undesired time lag. It was realized that improved mechanical stability could be obtained by operating the bimetallic spring element in a chamber filled with a chemically inert damping liquid but the dominant design requirement of a substantially frictionless mounting of the instrument pointer and its staff indicated that it was not possible to provide a liquid-tight seal between those portions of the sealed thermometer casing in which the bimetallic operating element and the indicating scale, respectively, are located. All of the known types of shaft packing would prevent movement of the thermometer staff by the minute forces developed by the helical bimetallic coils of a sensitive thermometer.

An object of the present invention is to provide precision bimetallic thermometers that possess the characteristics, previously considered to be mutually exclusive, of high sensitivity and high mechanical stability. An object is to provide sensitive bimetallic thermometers in which the bimetallic element and the instrument scale are enclosed within different chambers of a sealed thermometer casing, the chamber housing the bimetallic element being filled with a chemically inert damping liquid. More specifically, an object is to provide a sensitive bimetallic thermometer comprising a sealed casing that includes an operating element chamber in open communication with an instrument scale chamber, a bimetallic element within the first chamber for rotating a staff that extends into the instrument scale chamber and carries a pointer, and a vibration-damping liquid within the operating element chamber; the physical characteristics of the damping liquid being such that the liquid will not flow through, or creep along the walls of, the passage that connects the chambers of the thermometer casing.

Figure 2:
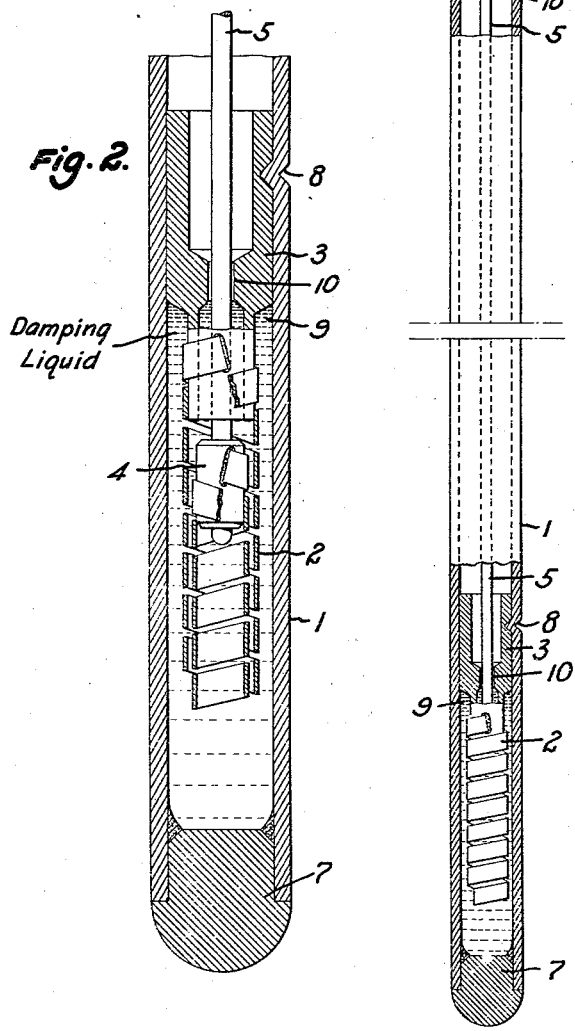

These and other objects and advantages of the invention will be apparent from the following specification when taken with the accompanying drawing in which:

Fig. 1 is a fragmentary central section through a bimetallic thermometer embodying the invention; and Fig. 2 is a similar sectional view, on a larger scale, of the portion of the thermometer stem within which the bimetallic operating element is located.

In the drawing, the reference numeral 1 identifies the tubular shell in which the thermally-responsive multiple spring unit 2 is mounted. As shown, the bimetallic spring 2 is in the form of a helix comprising an inner and outer winding. One end of the multiple helical spring, namely, the upper end of the outer winding, is firmly secured to a metal bushing 3 in any suitable manner, such as by soldering, welding, or the like, and the other end, i. e. the upper end of the inner winding, is secured in like manner to the small bushing 4 which is force fitted on to the staff 5, the latter carrying an indicating pointer 6 on the opposite end. The staff 5 is not supported on an end bearing but is "floated" upon the inner winding and takes an angular position depending upon the sum of the temperature-produced angular displacement of the two windings.

A cap 7 is tightly fitted into the lower end of the shell 1 and soldered or brazed thereto to provide a moisture tight sealing of the said shell. The bushing 3 is also tightly fitted within the shell 1 and staked into position at several points, one of such points being shown as the deformation 8 in the drawing. It can be seen, therefore, that the bimetallic spring functions within a chamber 9 that is sealed at all points except the clearance hole 10 in the bushing 3. The clearance hole is necessary to permit unobstructed rotation of the staff as the bimetallic spring generates only a feeble force upon small changes in temperature. It is likewise essential that the helical spring be substantially centrally disposed within the chamber so that the convolutions of the outer winding do not touch the shell wall or each other.

A flat casing 11 is mounted on the tubular shell 1 and carries a scale plate 12, the casing having a cover glass 13 that is held in position by the ring 14. An annular spacing member 15 occupies the space between the cover glass and the scale plate so that all parts are firmly held in position by the ring 14 which is internally cemented into place by a plastic or cement 16. The metal bushing 17 which is interposed between the casing 11 and the shell 1 is soldered or brazed to the casing to provide a moisture tight seal at this point, and the staff 5 is held in axial alinement with the shell by the bushing 18. The scale plate may carry suitable graduations of temperature units corresponding to the temperature range of the particular bimetallic spring 2 of the thermometer assembly.

The several parts of the instrument, except for the bimetallic element 2, are preferably formed of stainless steel to avoid damage from air, other gases or liquids.

In accordance with this invention, the clearance between the staff 5 and the cylindrical wall of the bore 10 of bushing 3 is restricted to a few thousandths of an inch, and the chamber 9 is filled or substantially filled with a liquid that damps the movement of the bimetallic element 2 under mechanical shocks and vibrations. The liquid, to be entirely satisfactory, must satisfy a number of requirements. It must not pass into other sections of the sealed casing by flowing or creeping, and it must not solidify or vaporize within the temperature range for which the thermometer is designed. Further, the liquid should be non-corrosive and it should remain stable over the normal temperature range to which it may be subjected.

Non-drying or semi-drying non-reactive fixed vegetable oils having sufficiently high viscosity effectively to damp oscillations and to absorb shock are well suited for this purpose. Preferably the oil should be of the unsaturated or hydroxy types such as the oils of castor bean, soy bean, olive, peanut, etc. Derivatives of these oils and blown oils are also satisfactory.

In particular, castor oil is admirably suited for use in thermometers constructed of stainless steel and having a range of approximately 0–300 degrees Fahrenheit. The oil does not flow or creep along the walls of stainless steel that form the restricted clearance passageway even though the thermometer be inverted for long periods of time. The absence of liquid flow and creepage appears to be due to the surface tension and viscosity characteristics of the oil but the exact technical explanation of the satisfactory operation is not now known. Tests have shown that castor oil would be effectively sealed within the chamber 9 by wall surfaces of some metals other than stainless steel, and tests with petroleum oils having the general characteristics of lubricating oils designated as "SAE 40" have demonstrated that closely opposed wall surfaces of stainless steel will not prevent creepage of the petroleum oil. It is possible, however, to seal the petroleum oil within the chamber 9 by forming one or both of the opposed walls of the restricted clearance opening of a material that is not "wetted" by the oil. The material may be applied to the metal casing or the staff as an adherent coating, or as a sleeve or bushing.

So far as is now known, it is broadly new, in sensitive bimetallic thermometers in which an operating element chamber and an instrument scale chamber are in open communication through the clearance around the instrument staff, to fill the operating element chamber with an inert damping liquid that is effectively sealed off from the instrument scale chamber. It is therefore to be understood that the invention is not limited to the particular embodiment herein described, and that various modifications that may occur to those familiar with the art fall within the spirit of my invention as set forth in the following claims.

I claim:

1. In a bimetallic thermometer, a casing comprising a hollow stem closed at one end and opening into a scale chamber at its other end, a bimetallic operating element within the closed end of the stem, a staff secured to said element and extending through said stem into said scale chamber, a pointer carried by the staff for cooperation with a scale plate within said scale chamber, a bushing within said stem between the operating element and the scale chamber, said bushing having a bore therethrough for receiving said staff with a loose fit, and castor oil within said hollow stem for damping said operating element.

2. In a bimetallic thermometer, the invention as claimed in claim 1 wherein said bushing and staff are of stainless steel.

3. In a bimetallic thermometer, the invention as defined in claim 1 wherein the damping liquid is an acylated castor oil.

4. In a bimetallic thermometer, the invention as defined in claim 1 wherein the damping liquid is acetylated castor oil.

5. In a bimetallic thermometer, a casing comprising a hollow stem closed at one end and opening into a scale chamber at its other end, a bimetallic operating element within the closed end of said hollow stem, a pointer within said scale chamber and a staff connecting said bimetallic operating element and said pointer, an annular metallic surface carried by said staff and an annular metallic surface carried by said stem, said annular metallic surfaces being opposed to each other between the bimetallic operating element and the scale chamber to define a chamber within said stem within which said bimetallic operating element is enclosed, said surfaces being spaced apart to preclude frictional contact thereof and to define a narrow annular passage between said scale chamber and the chamber in which said bimetallic operating element is enclosed, and castor oil within said last named chamber serving as damping liquid for said bimetallic operating element.

ROYAL H. MURRAY.